US 6,691,070 B1

(12) United States Patent
Williams et al.

(10) Patent No.: US 6,691,070 B1
(45) Date of Patent: Feb. 10, 2004

(54) SYSTEM AND METHOD FOR MONITORING A CONTROLLED ENVIRONMENT

(75) Inventors: Matthew R. Williams, Wyncote, PA (US); Michael A. Crusi, West Lawn, PA (US)

(73) Assignee: Mack Information Systems, Wyncote, PA (US)

( * ) Notice: Subject to any disclaimer, the term of this patent is extended or adjusted under 35 U.S.C. 154(b) by 147 days.

(21) Appl. No.: 09/706,421

(22) Filed: Nov. 3, 2000

(51) Int. Cl.$^7$ .......................... G06F 11/30; G21C 17/00
(52) U.S. Cl. ...................................... 702/188; 702/184
(58) Field of Search ................ 702/19–22, 33, 702/108, 121, 122, 127, 130, 182–185, 187, 188; 713/200; 436/43; 714/31, 47

(56) References Cited

U.S. PATENT DOCUMENTS

| | | | | |
|---|---|---|---|---|
| 5,337,360 A | * | 8/1994 | Fischer | 709/202 |
| 5,339,261 A | * | 8/1994 | Adelson et al. | 714/47 |
| 5,521,845 A | * | 5/1996 | Ukon et al. | 340/825.23 |
| 5,721,676 A | * | 2/1998 | Bolden et al. | 422/72 |
| 5,737,536 A | * | 4/1998 | Herrmann et al. | 709/217 |
| 5,740,185 A | | 4/1998 | Bosse | 714/749 |
| 5,802,391 A | | 9/1998 | Hwang | 710/2 |
| 5,832,411 A | * | 11/1998 | Schatzmann et al. | 204/406 |
| 5,845,076 A | | 12/1998 | Arakawa | 709/203 |
| 5,867,821 A | | 2/1999 | Ballantyne et al. | 705/2 |
| 5,925,095 A | | 7/1999 | High, Jr. et al. | 707/2 |
| 5,939,326 A | | 8/1999 | Chupp et al. | 436/43 |
| 5,944,782 A | | 8/1999 | Noble et al. | 709/202 |
| 5,956,489 A | | 9/1999 | San Andres et al. | 709/221 |
| 5,974,124 A | | 10/1999 | Schlueter, Jr. et al. | 379/106.02 |
| 5,974,446 A | | 10/1999 | Sonnenreich et al. | 709/204 |
| 5,978,802 A | | 11/1999 | Hurvig | 707/8 |
| 5,987,501 A | | 11/1999 | Hamilton et al. | 709/203 |
| 5,987,511 A | | 11/1999 | Elixmann et al. | 709/221 |
| 5,987,519 A | | 11/1999 | Peifer et al. | 709/230 |
| 6,223,287 B1 | * | 4/2001 | Douglas et al. | 380/255 |
| 6,278,960 B1 | * | 8/2001 | De Groot | 702/188 |
| 6,370,487 B1 | * | 4/2002 | Dorough | 700/121 |
| 6,502,192 B1 | * | 12/2002 | Nguyen | 713/201 |
| 2001/0053963 A1 | * | 12/2001 | Kim et al. | 702/188 |

FOREIGN PATENT DOCUMENTS

EP 678817 A1 * 10/1995 ........... G06F/17/60

OTHER PUBLICATIONS

RD 317003 A, Sep. 1990.*
System Manuals—Mack LabLINK Central Temperature Monitoring and Recording System—Apr. 5, 1996.
Cost Savings and Productivity Advancements Using Wireles Internet Integration for Process Monitoring, Xsilogy Inc., printed Aug. 1, 2000.
Mack LabLINK: The Monitoring and Recording System Designed Specifically for laboratories—Aug., 1993.

* cited by examiner

Primary Examiner—Marc S. Hoff
Assistant Examiner—Manuel L Barbee
(74) Attorney, Agent, or Firm—RatnerPrestia

(57) ABSTRACT

A system is provided for monitoring a condition of a controlled environment. The system includes a first computer configured to store data corresponding to a condition of the controlled environment. The first computer is validated, wherein subsequent alteration of the first computer voids the validation of the first computer. The system further includes a second computer coupled to the first computer. The second computer is configured for access to the data stored in the first computer and for communication of the condition of the controlled environment to a user of the second computer, wherein alteration of the second computer does not void the validation of the first computer. A validation module of the system is configured to validate the second computer for the access and communication, thereby validating the system. A method for monitoring a controlled environment is also provided.

22 Claims, 8 Drawing Sheets

*100

User Login

Please validate this user session by answering the following questions:

Yes

1) Does this apper in WHITE text on a BLACK background? ☐

2) Does this appear in BOLD WHITE text on a RED background? ☐

3) Does this appear in BOLD YELLOW text on a GRAY background? ☐

4) Does this apper in CYAN text on a BLACK background? ☐

5) Does this appear in BOLD WHITE text on a PURPLE background? ☐

Enter your email address of username _____

Enter your Password _____

[Login]

Please enable Cascading Style Sheets and Cookies on this computer. Cascading Style Sheets are required yo properly view information on the LabLINK Web. The system will set a single, short term cookie as a session id. Having a cookie set will minimize the number of times the system asks for your login information. You do not have to enable cookies to use the LabLINK Web system. Enabling them will make using it a little easier.

FIG. 6

SYSTEM AND METHOD FOR MONITORING A CONTROLLED ENVIRONMENT

FIELD OF THE INVENTION

The present invention relates, in general, to a system and method for monitoring a controlled environment and, more particularly, to a system and method of communicating information between a user and a computer system for monitoring a controlled or regulated environment, where the burden of validating and revalidating the computer system is minimized.

BACKGROUND OF THE INVENTION

Many computer-based systems should or must be validated prior to their use. Validation is especially advantageous in systems used for monitoring and controlling regulated environments or processes. An example of a system requiring validation prior to use is a medical device that includes software. Another example is software used to design, develop or manufacture medical devices. Such validation is accomplished within the context of other components of the system in which the validated component is used.

In the given examples, Food and Drug Administration (FDA) regulations mandate that before such a system is used, the system must be validated. Guidance regarding the FDA regulations is provided in the following publications, which are incorporated herein by reference:

General Principles of Software Validation, Draft Guidance Version 1.1 (released for comment on Jun. 9, 1997);

Off-The-Shelf Software Use in Medical Devices, issued Sep. 9, 1999; and

Guidance for the Content of Premarket Submissions for Software Contained in Medical Devices, issued May 29, 1998.

Each of the foregoing publications was provided by the U.S. Department of Health and Human Services, Food and Drug Administration, Center for Devices and Radiological Health, Office of Device Evaluation.

Validation under the FDA regulations involves testing the hardware and software components of the computer system. Every function, whether implemented as a hardware component or a software component, must be tested and verified to confirm that it is functioning as intended by the manufacturer.

In some instances, even though validation may not be mandated by FDA or other regulations, such validation is often recommended. This is the case for systems that are used in conjunction with regulated or controlled environments or processes. For example, computer-based systems that are used to collect, store, and monitor the temperature of human blood are advantageously validated in order to ensure that the hardware and software components of the system are functioning as intended by the manufacturer. Validation also confirms that the system function meets the user's requirements.

Whether mandated by regulations or performed voluntarily, testing and verification often takes many hours. This is because, not only should every function be tested and verified, but every possible variation of a function and every possible interaction between one function and another function should also be tested and verified.

The hardware and software configuration, as well as the software version, should be identified and documented. More specifically, the system configuration (i.e., software, hardware, and driver versions, etc.) is typically documented before or during validation, and validation is not complete without specifying the exact system configuration. No further modifications may be made to the system, and the system is "frozen". The system may now be used.

If the manufacturer or software designer issues hardware improvements or new software versions to the computer system and the user wishes to upgrade the system, use of the computer system should stop and the system should be tested and verified once more for validation. New test procedures should be written, and more extremely labor intensive hours are likely to be expended. In the mean time, otherwise automated processes are performed and recorded by hand.

Furthermore, once validated, any changes to the system, such as preventive maintenance, changing software drivers, adding application programs or changing the operating system configuration voids the validation. Typical changes requiring revalidation include adding, moving or otherwise re-arranging equipment or replacing failed equipment. Additionally there are some periodic revalidation requirements to ensure that equipment continues to operate within calibration, but such periodic validation does not necessarily relate to the validation of the overall system. An example of such periodic validation is documenting actual temperature reading of a temperature sensor every 6 months against a NIST traceable standard thermometer.

Typical revalidation triggered by replacing equipment is tailored to the equipment replaced. For instance, if a monitor is replaced the validation protocol will preferably consist of:

1) recording the monitor's serial number, the user's identification, date, etc., and 2) documenting that the colors on the screen are correct and in focus.

More complex components will be likely to require more involved validation. It may be unusual, short of replacing the main computer, to have to repeat the entire validation of the system. The validation that is performed should, however, document the proper operation of the changed component. For example, FDA regulations require that changes to a component of a system be validated. It is up to the user (ultimately, with assistance from the manufacturer of the system) to determine the validation protocol to be used.

A need, therefore, still exists to develop a system that can be used to monitor a controlled or regulated environment, where the burden of validating and revalidating the system is minimized. The present invention addresses that need.

SUMMARY OF THE INVENTION

To meet this and other needs, and in view of its purposes, the present invention provides a method and a system for monitoring a controlled environment.

The system includes a first computer configured to store data corresponding to a condition of the controlled environment. The first computer is validated, wherein subsequent alteration of the first computer voids the validation of the first computer. The system further includes a second computer coupled to the first computer. The second computer is configured for access to the data stored in the first computer and communication of the condition of the controlled environment to a user of the second computer, wherein alteration of the second computer does not void the validation of the first computer. A validation module of the system is configured to validate the second computer for the access and communication with respect to the first computer, thereby validating the system.

According to another aspect of the invention, a method is also provided for monitoring a controlled environment using a system having a central application program that can be linked for communication with a separate application program. The method includes validating the central application program. Data from the controlled environment is collected and stored using the central application program, and the separate application program is validated for communication of data from the central application program. The central application program is linked to the separate application program. Data is then communicated from the central application program to the separate application program without voiding validation of the central application program.

According to yet another aspect of the invention, a method is provided for validating a separate application program for communicating data from a central application program before permitting access to the central application program by the separate application program. The method includes transmitting symbols or indicia to a user of the separate application program in response to a request for data. The user of the separate application program is surveyed regarding the user's receipt of the symbols, and the survey results are received from the user. The accuracy of the survey results is verified, and access by the separate application program to data collected and stored by the central application program is subsequently provided.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 6 is an illustration of an embodiment of a log-in page that can be displayed on a monitor for use in validating a user-configurable computer in accordance with the present invention.

DETAILED DESCRIPTION OF THE INVENTION

Figure 1A:
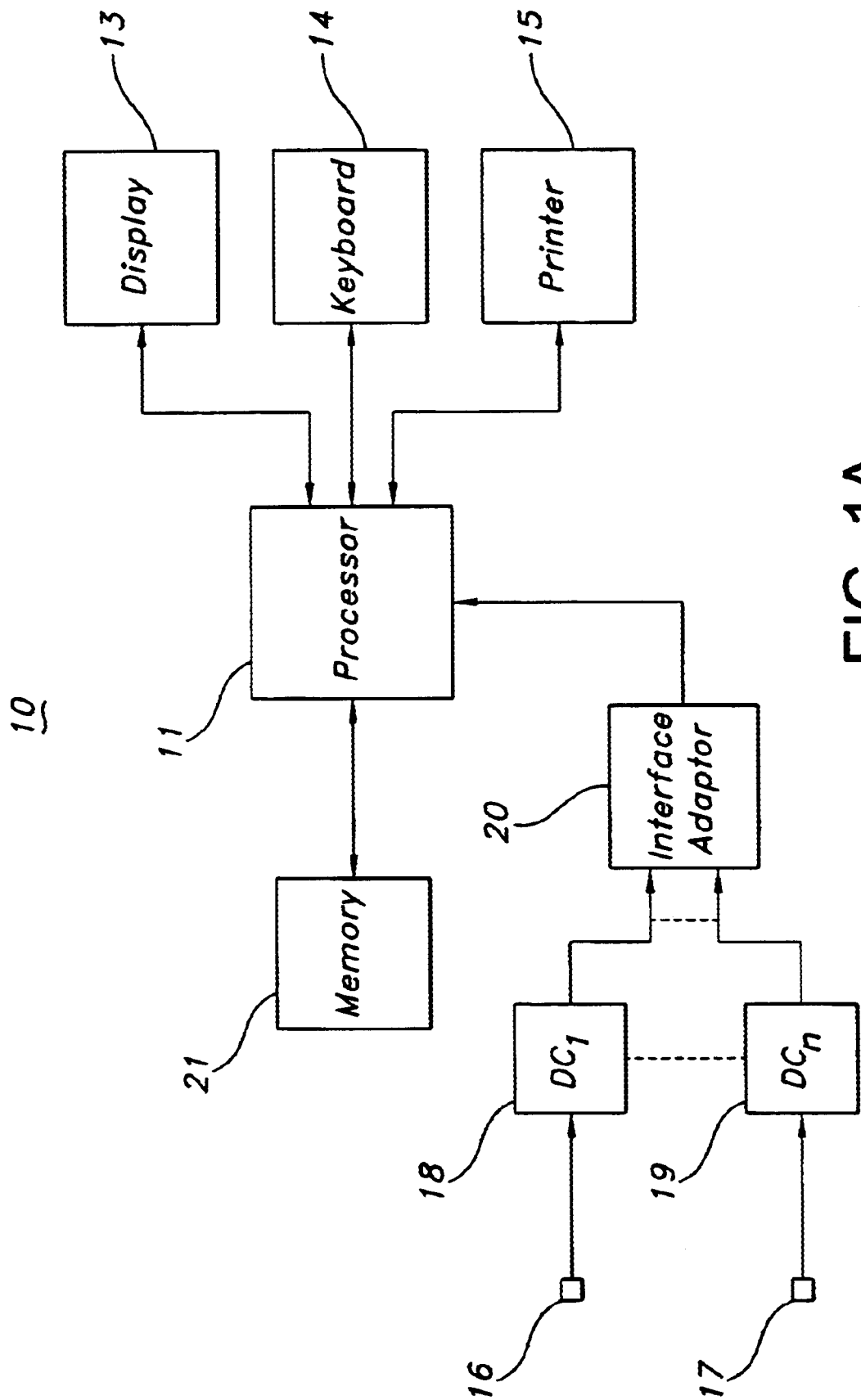
FIG. 1A is a block diagram of a computer-implemented system for monitoring a controlled environment.

Throughout the following detailed description similar reference characters refer to similar elements in all Figures of the drawings. Preferred embodiments of the invention will be described with reference to a system adapted to collect, store, and monitor the temperature of human blood stored in refrigerator banks. It will be appreciated, however, that this invention applies equally to systems adapted for other applications as well. Specifically, aspects of this invention can be applied to any system for monitoring a condition in a controlled or regulated environment. More broadly, aspects of this invention can be applied to any system in which data is to be transmitted from one application program to another. Accordingly, the scope of this invention is not limited to the embodiment selected for illustration in the figures. Instead, the scope is defined separately in the appended claims.

FIG. 1A illustrates a system, generally designated by the reference character 10, used for monitoring one or more conditions of regulated processes. System 10 includes a processor 11, which may be a personal computer (PC) or equivalent. Also included are a display 13, a keyboard 14, a printer 15 and a memory 21. As conventionally implemented, processor 11 communicates with display 13, keyboard 14 and printer 15. A user interface may include any variety of conventional application programs operating with, for example, a DOS operating system. The application programs may include a display driver, a keyboard driver and a printer driver.

A plurality of data collectors, $DC_1$ to $DC_n$, generally designated as 18 and 19, respectively, are coupled to processor 11 by way of an interface adapter 20. Data collectors 18 and 19 may each sample data provided by sensors 16 and 17, respectively. Each data collector can have up to two (2) or more sensors and multiple contact closure sensors. Also, each data collector can include internal sensors to monitor the AC power and its internal batteries. The data sampled may be the temperatures within a plurality of refrigerators storing human blood. The sensors may be thermometers placed in the refrigerators for measuring temperature.

Figure 1B:
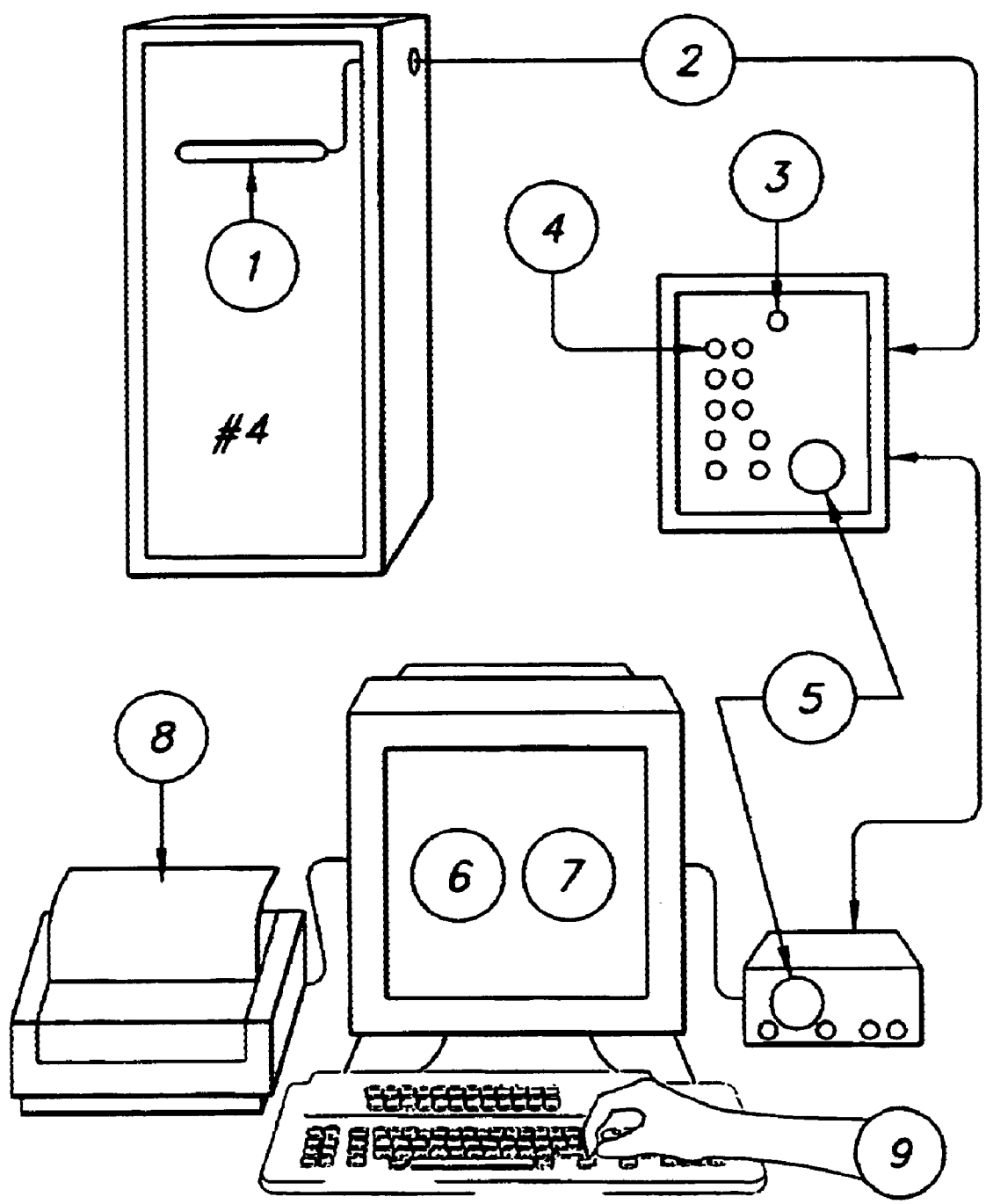
FIG. 1B illustrates a specific embodiment of the computer-implemented system shown in FIG. 1A.

Referring now to FIG. 1B, a system specifically adapted for monitoring temperature of stored human blood is illustrated. The system is configured to indicate all deviations from a safe condition within a refrigerator at three (3) locations, including the computer and central interface, the printer, and the data collector. A high temperature alarm would initiate the following typical sequence of steps corresponding to the numerals in FIG. 1B:

(1) a temperature sensor in the refrigerator ("#4") connected to the data collector detects a high temperature rise;

(2) the sensor transmits temperature data to the data collector and the computer;

(3) the data collector's safe green LED is extinguished;

(4) the data collector's danger red LED "HIGH ALARM" light turns on;

(5) audible alarms are actuated at the data collector and at the computer;

(6) the computer identifies the source of data and recognizes the specific alarm mode;

(7) the alarm condition is highlighted on the computer screen with the equipment name, the current temperature, and the limit that the current temperature is exceeding;

(8) the printer automatically prints the nature of the alarm, the date, the time, the user entered label information, the data collector identification number, and the current temperature; and (9) if an authorized acknowledgement (password access) occurs, the audible alarm at the computer is silenced and a printed record is generated showing the date, the time, the user entered label information, the data collector identification number, temperature, and the identity of the person acknowledging the condition.

The system illustrated in FIG. 1B is a comprehensive temperature monitoring and recording system. The system can be expanded to accommodate five hundred temperature sensors or more. Generally the system includes a dedicated computer, a printer, a central station interface, and a system of data collectors. The computer permits on-site entry of data to specifically configure the system to an individual laboratory and has a visual, color-coded display or indicia of conditions of each monitored point. The data from each data collector can be printed automatically at pre-determined intervals. In the event of any unsafe deviation, an immediate printout occurs in conjunction with the audible alarm, which identifies the exact location and nature of the problem.

Acknowledgement of the alarm must be made by authorized personnel, and a record of the acknowledgement is automatically printed. Upon return to a safe condition, a record is automatically printed showing the condition corrected.

The computer scans each of the data collectors in the system, and the gathered information is compared against the parameters stored in the memory of the computer so that the results can be displayed and periodically printed. The data collectors are small computers located remotely from the central computer at the equipment that is being monitored. In the embodiment illustrated in FIG. 1B, for example, the data collectors monitor the temperature condition, AC power, and door status of one or two pieces of equipment (i.e., refrigerators) with similar operating temperature ranges.

The data collectors are preferably mounted near the equipment they are dedicated to monitoring and connected to the system by low voltage wiring with modular connectors. The data collectors are preferably interconnected to each other in "daisy chain" fashion, thus eliminating the costly "home run" type installations.

Plug-in sensors connected to the data collectors include a probe. Each of the data collectors and their associated sensors have a dedicated temperature range and are matched to the temperature range of the equipment they are intended to monitor.

The central station of the system illustrated in FIG. 1B includes a display screen with three parts, including a current status window, a communications message window, and a systems message window. The current status window shows information from data collectors and additional information. The communications message window shows the status of the communications process and lists errors, re-try's, etc. Finally, the system message window lists non-monitoring items requiring attention such as notification of scheduled items (e.g., system backup).

The exemplary system illustrated in FIG. 1B is, as mentioned above, specifically adapted to monitor the temperature of human blood that is stored in a system of refrigerators in a blood bank. Components of the system illustrated in FIG. 1B are available under the trademark LABLINK from Mack Information Systems, Inc. of Wyncote, Pa.

It has now been recognized that any modification to any portion of the system shown in FIGS. 1A and 1B should, in a validated system, be followed by a new test and validation of the modified component of the system or of the entire system. For Example, replacement of the computer component of the illustrated system voids the validation of the computer (although such replacement should not affect the validation of the data collectors). Similarly, replacement of a failed data collector should not void the validation of the computer.

Current generation operating systems, such as the Windows family of products, may periodically and without notification to the user, modify. software configurations and perform periodic maintenance. This makes their use in validated computer systems very difficult, if not unfeasible. Because of the periodic upgrades, it has been discovered that the user has difficulty determining the exact configuration of the system at a given time. Even if such a system is validated, there is no method for noting when preventive or periodic maintenance has occurred. Thus, the user cannot be absolutely certain that the system is still validated at a later date.

Figure 2:
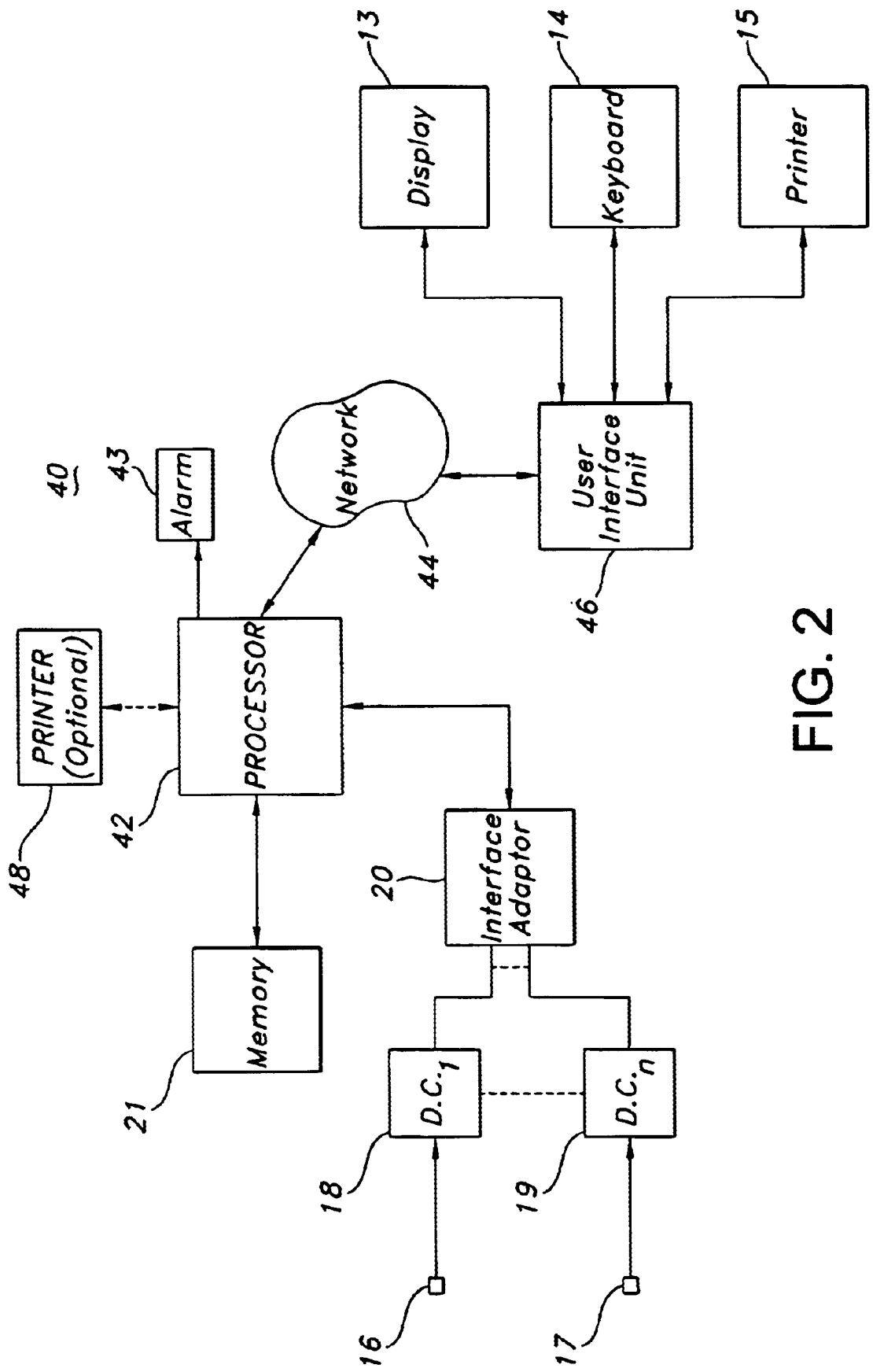
FIG. 2 is a block diagram of a computer-implemented system for monitoring a controlled environment in accordance with one embodiment of the present invention.

FIG. 2 illustrates a computer-implemented system that reduces the burden of validation and increases the certainty that a validated system will remain validated. It will be appreciated from the following discussion that, in a preferred embodiment, the system according to this invention can provide a fixed, validatable central server connected to one or more instantly re-validatable operator interfaces. Such a system has been discovered to effectively facilitate validation of a system for applications in which such validation is required (e.g., medical devices governed by FDA regulations) or for applications in which validation is advantageous or otherwise desired. A system according to this invention makes it possible to utilize a network of computers, at least some of which can be instantly re-validated in the course of their normal usage.

Specifically, FIG. 2 illustrates a system for monitoring a controlled environment, generally indicated by the reference character 40, in accordance with the present invention as implemented in the environment of a large blood bank center. In the embodiment shown in FIG. 2, the computer-implemented system continuously monitors temperatures of a plurality of refrigerators storing human blood. As will be developed, the computer-implemented system includes a processor 42 having an operating system and several application programs for collecting, analyzing, formatting and storing temperature data. Processor 42 is linked to at least one temperature sensor 16, 17 by way of data collectors 18, 19 and interface adapter 20. Processor 42 continuously collects data from the temperature sensors, analyzes and formats the data, and stores the data in a memory 21. Processor 42 may also print the temperature data in a selected format by way of optional printer 48. Any temperature data, that is determined to be outside of acceptable temperature bands of a refrigerator being monitored, may cause processor 42 to send an alert, by triggering a warning to a user by way of alarm unit 43. The alarm unit 43 can be incorporated into the interface adapter 20 or additional alarms can be used as illustrated at 43.

As will be developed, processor 42 is a first user-configurable computer containing an operating system and application programs necessary to accomplish various functions in a controlled environment. Once configured, tested and validated, however, processor 42 is preferably maintained at its present configuration, because any alteration requires retest and revalidation.

As shown in FIG. 2, processor 42 is linked to a user interface unit 46 by way of a network 44. Although not shown, an optional modem or other network access device is preferably connected to processor 42. User interface unit 46 is a second user-configurable computer containing an operating system and application programs. The operating system and application programs executed by user interface unit 46 are independent and separate from the operating system and application programs executed by processor 42. Communications between the first user-configurable computer (processor 42) and the second user-configurable computer (user interface unit 46) are accomplished by way of network 44. Because each user-configurable computer is independent of the other, any alterations to one computer does not affect the other computer. More particularly to the invention, any reconfiguration to user interface unit 46 does not require retest and revalidation of processor 42.

As it is desired to display and print the status of various elements in the controlled environment, user interface unit 46 is configured to accomplish those functions. For example, in the embodiment shown in FIG. 2, user interface unit 46 displays and records the daily temperature status of each refrigerator holding human blood in a large blood bank center. User interface unit 46 is configured to display and print the temperature by communicating with processor 42 through network 44; providing instructions by way of a keyboard 14; informing the user by way of a display 13; and providing a permanent record of the temperature data by way of a printer 15.

It will now be appreciated that the ingenuity of the system 40, as compared to the computer system 10 shown in FIG. 1, is in providing two separate user configurable computers linked by a network. Preferably, processor 42 is configured with as few necessary functions as possible, whereas user interface unit 46 is configured with as many functions as desired, although not necessarily required. Once processor 42 is validated for its controlled environment, its configuration is fixed or "frozen", so that it does not require revalidation. User interface unit 46, on the other hand, may be modified, reconfigured or upgraded, without voiding the validation of processor 42, because it is independent of processor 42 and communicates with processor 42 by way of network 44. Thus, user interface unit 46 may contain a conventional operating system, such as Windows, and conventional application programs, such as display drivers, print drivers and browser interfaces. These programs may be modified and upgraded, without voiding the validation of processor 42.

It will be appreciated that network 44 may be a Local Area Network (LAN) or a Wide Area Network (WAN). The LAN may be preferred in an environment with only one or a few user interface units, whereas the WAN may be preferred in an environment with many user interface units or multiple processor units. Network 44 may also be the Internet, which may be preferred to facilitate the monitoring of data from remote locations.

Although not shown, each input/output port of processor 42 and user interface unit 46 may be, for example, a 10 Mbit Ethernet, a serial RS-232 port or a parallel RS-232 port. The network protocol may be TCP/IP.

Figure 3:
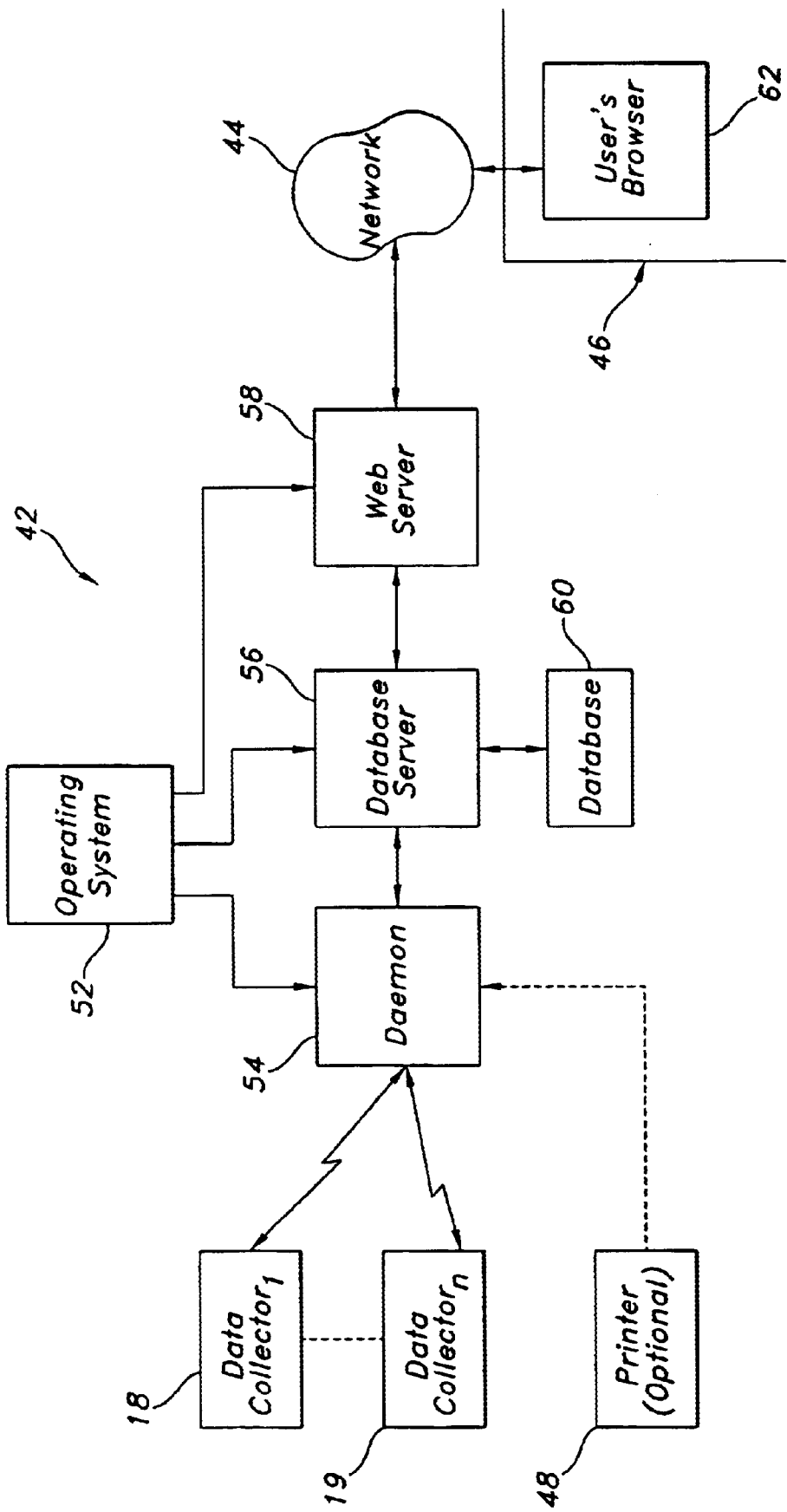
FIG. 3 is a block diagram of the computer-implemented system of FIG. 2, showing an embodiment of software components that can be used in connection with the present invention.

Referring next to FIG. 3, there is shown software components of processor 42 and user interface unit 46 adapted for use with an Internet-based network system in which a browser application is utilized to access the processor. Software components of processor 42 include an operating system 52, a Daemon llweb application 54, database server 56 and web server 58. The only relevant software component residing in user interface unit 46 is a user's browser 62. The user's browser communicates with web server 58 by way of a network protocol, such as TCP/IP.

The Daemon application 54 ("Disk And Execution MONitor") is a custom application written in "C" which runs continuously. Completing FIG. 3, there is also shown a database server 56 communicating with a database 60. Database 60 may reside in memory 21 (FIG. 2) or in processor 42. The memory 21 can be in the form of RAM, a hard disk, a floppy disk, or any other known memory device.

Daemon application 54 gathers information from data collectors 18–19, analyzes the data and formats the data. Daemon application 54 interfaces with an operating system 52, which may be a Linux operating system for example. Linux is a community developed operating system similar to Unix. It provides a stable and reliable framework for accessing memory, disks, displays, networks, keyboards, etc., as well as for managing the system memory. The Linux operating system does not automatically update itself or change its own configuration as do most commercial operating systems. The Linux operating system is available from Red Hat, Inc. of Research Triangle Park, N.C. Once formatted, the data may be passed to database server 56, which may be a MySQL database server for example. MySQL is an SQL standard database application which runs on a variety of operating systems including Linux. MySQL stores and retrieves information using standard SQL commands.

In one embodiment, Daemon application 54 may run continuously in a loop. It may communicate with each data collector, evaluate the gathered information and determine an appropriate response. Instructions may be passed to the database server to store the data, as formatted by the Daemon application. If necessary, information may also be sent to optional printer 48. The Daemon application may also control audible and visual alarms between the data collectors 18, 19 and processor 42. The alarms may be used to indicate out-of-limit conditions to a local user.

Database server 56 is an application program for storing and retrieving information, as requested by other applications, such as Daemon application 54 and web server 58. Preferably, database server 56 does not communicate directly with other applications external to processor 42.

As an example, database server 56 (Mysql database server) may store or retrieve the following data:

(a) a list of data collectors, sensor inputs to the data collectors and their configuration;

(b) a list of groups of data collectors (e.g., data collectors located on a second floor of the blood bank center);

(c) a list of valid user's names and associated passwords;

(d) a list of user groups (for determining scope of authority of each user); and (e) a list of temperature and alarm events for each sensor of a data collector.

All communications between processor 42 and user interface unit 46 are executed by web server 58. As an example, web server 58 may be an Apache web server, which is available from the Apache Software Foundation of Forest Hill, Md. Web server 58 may retrieve information from database server 56, format the information and pass the information to the user's browser for display. The web server may also receive information provided by the user through user's browser 62. This information may include, for example, log-in data, instruction data to change the configuration of a data collector, or instruction data to display and print information in a specific format. Web server 58 passes the received information to database server 56.

It will be appreciated that in a preferred embodiment of the invention, the web server creates web pages using information from the database server, after a page is requested by the user's browser. When a page is requested, the web server determines whether the page is access restricted. If the page is not access restricted, the page is created and returned to the user's browser.

If the page requested by the user's browser is access restricted, the web server determines whether access should be provided. The browser supplies an authentication cookie to the web server when contact relative to a specific page is initiated. After successful login, a new or updated cookie is supplied by the web server to the browser.

Specifically, for example, the user's browser can be provided with a valid authentication cookie. If a valid authentication cookie exists, the requested page is created and returned to the user's browser. If the web server determines that a valid authentication cookie does not exist on the user's system, the web server returns a log-in page (described in detail later). The user must then successfully complete the log-in page. The completed log-in page is sent to the web server from the user's browser. If the user successfully completes the log-in page, the web server sends the user's browser a valid authentication cookie, and then creates and returns the originally requested page.

In an embodiment of the invention, web server 58 creates both static and dynamic pages. Static pages do not change whereas dynamic pages may vary their content over time. In general, menu or opening pages may be static; whereas status, system configuration or historical pages may be dynamic. The dynamic information is retrieved from database server 56.

In the preferred embodiment, the user interface unit may only communicate with web server 58 of processor 42. The user does not have direct access to the database server or the Daemon application. Access is limited and only granted to web server 58, after successful log-in procedures (described later). In this manner, any hardware or software problems internal to user interface unit 46 cannot affect the functioning of processor 42. As a result, processor 42 remains validated, although user interface unit 46 is linked to processor 42 by way of network 44.

An authentication cookie may be an integer number, for example. In order to confirm the validity of an authentication cookie, the web server may search for a matching integer number in a table of the database server. If the integer number is listed in the table and has been refreshed within a predetermined interval (for example 10 minutes), the cookie may be considered valid. If the integer number is not found in the table, on the other hand, or has not been refreshed within the predetermined interval, the cookie may be considered invalid.

Any time a user accesses a restricted access page with a valid authentication cookie, that cookie is preferably refreshed. This permits the user to log-in once and move around the system without having to re-enter his password. After a predetermined time interval (for example 10 minutes), the user's session may be terminated automatically. The user may also terminate the session by logging out prior to expiration of the predetermined interval.

Figure 4:
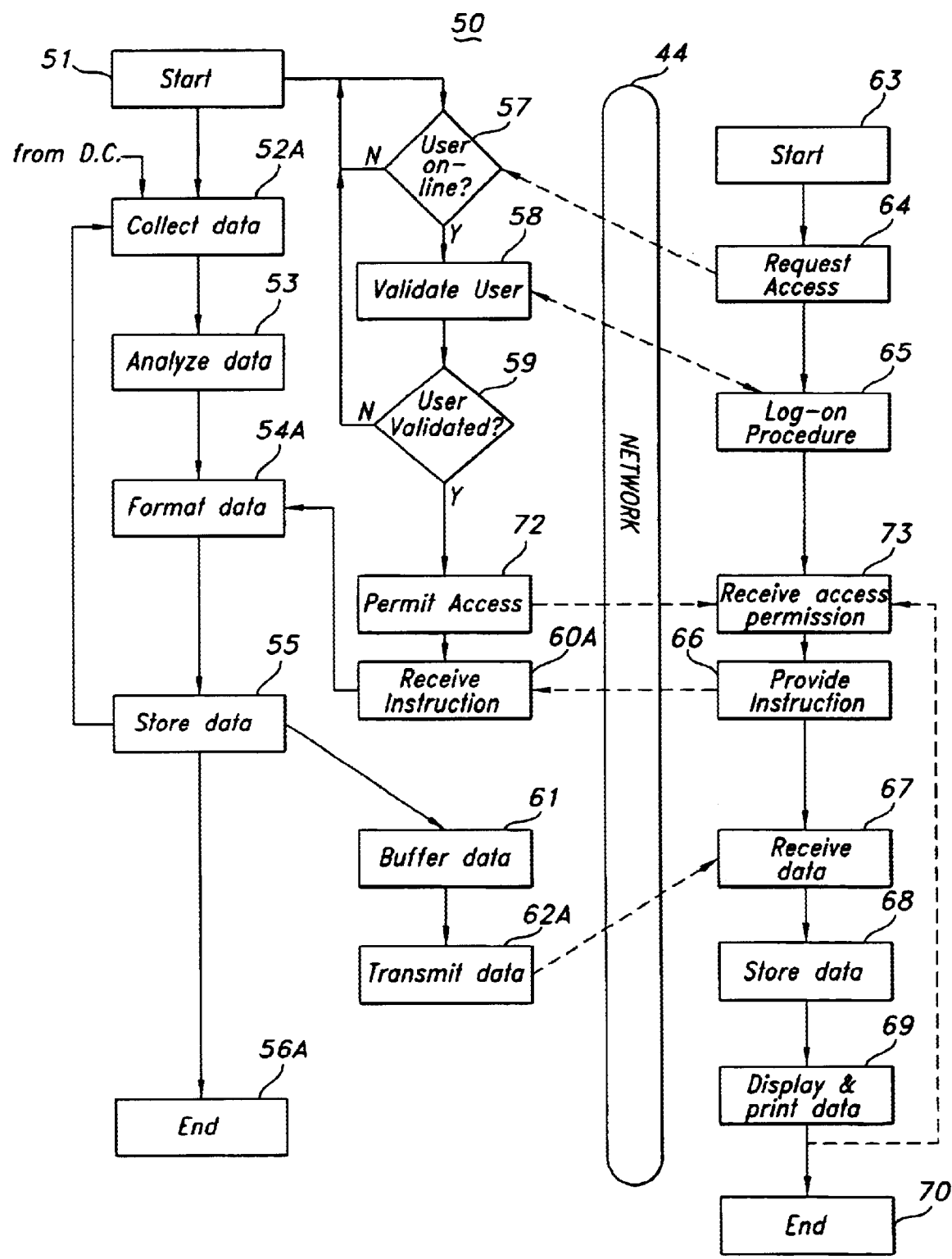
FIG. 4 is a flow diagram showing an embodiment of a process for implementing communications between two user-configurable computers through a communications network.

In operation, computer system 40 may include the process shown as a flow diagram in FIG. 4. The process, generally designated as 50, includes steps performed by processor 42 (shown left of network block 44) and steps performed by user interface unit 46 (shown right of network block 44).

Addressing the steps performed continuously by processor 42 after start-up (step 51), there is shown, in sequence, collecting data provided from the data collectors (step 52A); analyzing the data (step 53); formatting that data (step 54A) and storing the data (step 55). Unless powered-down (step 56A), processor 42 continues operating in the loop shown by collecting data as a function of time for every sensor monitoring a refrigerator. Steps 52A through 55 may be performed by the Daemon application and the database server programs.

The web server program monitors the network to determine whether a user is on-line (step 57). When a user is on-line, step 57 branches to step 58 to validate the user. After the user is validated, step 59 branches to step 72 and permits access by providing a restricted page to the user. Step 60A is entered and the web server waits to receive instructions from the user. It will be appreciated that the instructions, for example, may include requesting access to a new page, requesting an alarm threshold to be modified, and requesting data in a specific format. The request is transferred to the database server, which executes the instructions, independently of or with the assistance of the Daemon application.

Still referring to FIG. 4, the user's browser, after start-up (step 63), requests access to processor 42 (step 64). It will be understood that the access requested is access to a restricted page, indicating that the user's interface unit desires access to the controlled environment being monitored by processor 42. As will be developed in detail later, a specific log-in procedure is sequenced through by the user (step 65), before access is permitted by processor 42. The log-in procedure, if successfully executed, provides assurance that the user's interface unit may properly operate with the processor. In other words, the log-in procedure tests and validates a portion of the user's interface unit that communicates with the processor through network 44. In the preferred embodiment, as previously described, the only portion of the user's interface unit that communicates with the processor is user's browser 62. The log-in procedure preferably tests and verifies that every possible instruction received from the user, through the browser, and every possible form of data (including data resulting in alarms) sent to the user, through the browser, would successfully be communicated. In this manner, the log-in procedure extends the required test and validation to new components brought into the controlled environment. Not only is processor 42 in a validated state, but at least a portion of user interface unit 46 is now also in a validated state.

Completing the description of FIG. 4, after a successful log-in procedure, the user's browser enters step 73 and waits to receive the restricted page from the web server. Having received the restricted page, the user may now provide instructions to the processor through the web server (step 66). The instructions may, for example, create new data (in the form of a new page), which may be buffered (step 61) and transmitted (step 62A) to the user's browser. The user's browser may next receive the requested new data (step 67). The new data may be stored (step 68), displayed and printed (step 69), as desired by the user. Communications may be terminated between the user's browser and the web server (step 70) or the process may allow the user to request a different page by branching back to step 73 for new instructions. Although not shown, a time-out may be included in the process, so that after a predetermined interval, access may be denied to the user by the processor.

It will be understood from the figures that a preferred embodiment of a method according to this invention is particularly well suited for use in a system having a central application program (such as an application program in processor 42) that can be linked for communication with a separate application program (such as an application program in user interface unit 46). Prior to linking the central application program to the separate application program, the central application program is preferably validated. The validated central application program can then be used to collect and store data from a controlled environment.

Also, prior to linking the central application program to the separate application program, it should be verified that the separate application program can communicate data from the central application program. This is accomplished using a separate validation protocol according to this invention. In other words, independent of the validation of the central application program, separate validation of the separate application program can be performed prior to linking the two application programs, thereby providing a validated system that includes both of the application programs.

Validation that the separate application program communicates data from the central application program (before permitting access to the central application program) can be accomplished by transmitting indicia to a user of the separate application program in response to a request for data from the central application program. The indicia can be a display of color (as in the preferred embodiment illustrated in FIG. 6), text, sounds, alarms, symbols, or any other suitable indicia that can represent information provided by the central application program. The indicia transmitted to the user for validation of the separate application program preferably corresponds to the indicia that would be transmitted to the user to communicate data stored in the central application program. For example, if a color (or other indicia) is designated to indicate a specific alarm condition, then that color is preferably transmitted to the user of the separate application program prior to login in order to confirm that the separate application program is capable of receiving and displaying that color.

The user of the separate application program is then surveyed regarding the user's receipt of the transmitted indicia. In other words, the user is asked to respond regarding his or her perception of the transmitted indicia. The survey can be conducted in the form of a questionnaire (as in the embodiment illustrated in FIG. 6) or in any other manner to elicit an indication from the user of the separate application program that the transmitted indicia has been received as intended. The accuracy of the survey results is then verified.

After the accuracy of the survey results is verified, access by the separate application program to data collected and stored by the central application program is then provided. Accordingly, by conducting the validation method of this invention, a validation or confirmation that the separate application program is capable of proper receipt of data from the central application program is accomplished. This therefore ensures that the important information transmitted to the user can be accurately received.

Figure 5:
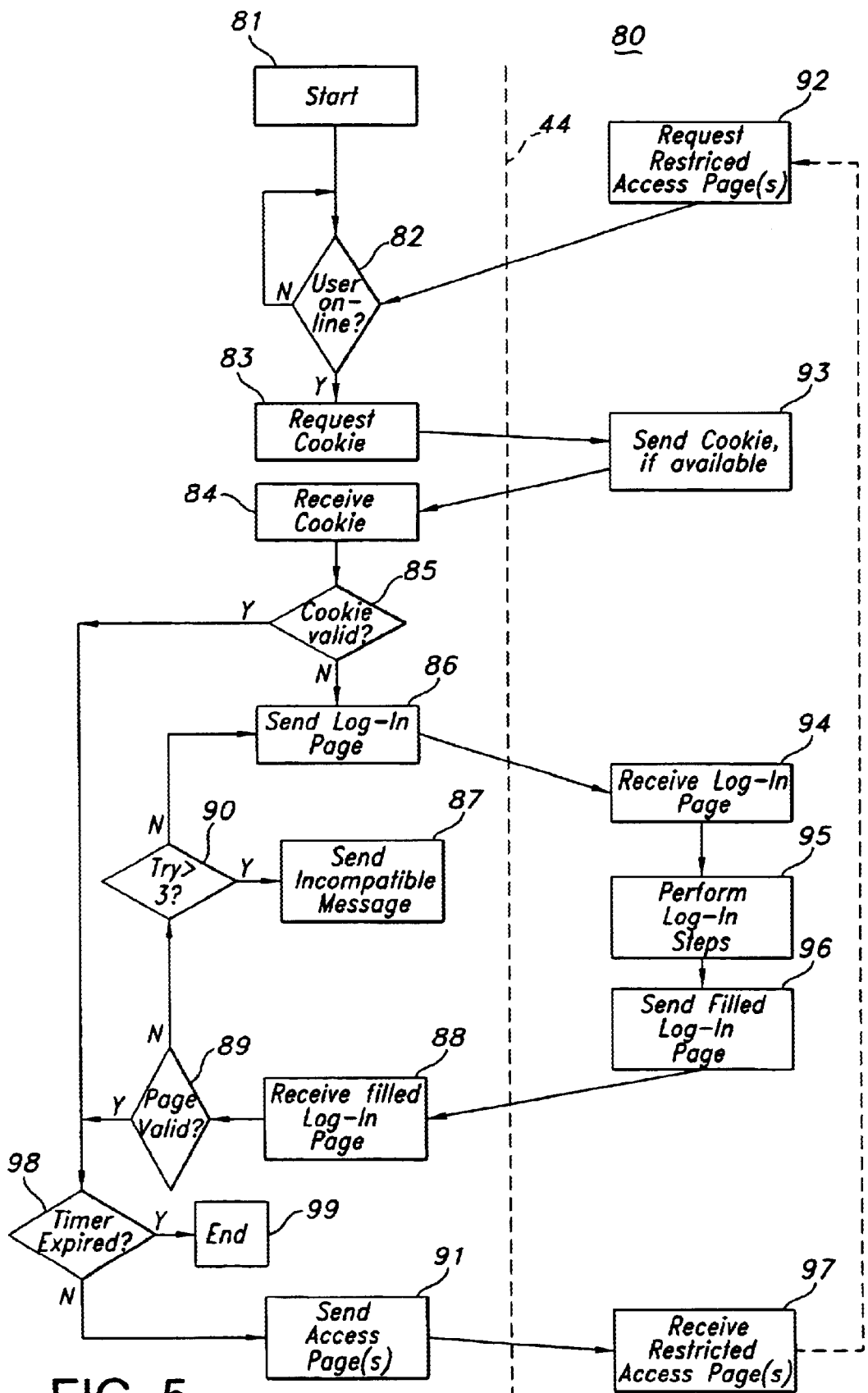
FIG. 5 is a flow diagram showing an embodiment of a method for validating a user-configurable computer through the communications network of FIG. 4, in accordance with aspects of the present invention.

The validation process will now be described in greater detail by reference to FIGS. 5 and 6. The validation process, generally designated by the reference character 80, begins at step 81. The validation process may be considered as a "handshaking" protocol sequenced between the web server and the user's browser. As shown, the browser requests access to a restricted access page (step 92). The server ascertains that the user is on-line (step 82). An authentication cookie is requested from the browser (step 83). If available, the browser sends the cookie to the web server (step 93). The web server receives the cookie and determines whether the cookie is valid (steps 84 and 85). If the cookie is valid, the process branches to step 91 and sends the requested restricted access page to the user (steps 91 and 97).

If the cookie is not valid (or if the cookie is not available), the process branches to step 86 and sends a log-in page to the user's browser (steps 86 and 94). The log-in page, generally designated as 100, is depicted in FIG. 6. As shown, the log-in page includes different texts printed on respectively different color backgrounds. In the embodiment shown, five different texts on five respectively different color backgrounds are provided. For example, the log-in page includes the following survey for the user:

(1) Does this appear in white text on a blue background?;

(2) Does this appear in bold white text on a red background?;

(3) Does this appear in bold yellow text on a grey background?;

(4) Does this appear in cyan text on a black background?; and (5) Does this appear in bold white text on a purple background?

The log-in page also includes boxes for checking "yes" to the five questions asked of the user. The user must confirm that the appearance of the display corresponds to the descriptions in the survey. If so, the user will answer "yes" to each of the five questions by checking the boxes. Answering "yes" verifies that the user interface unit is compatible with the processor and is capable of receiving and displaying data from the processor and is capable of interacting with the web server.

After checking "yes" to the five questions and confirming that the text and colors are displayed on the user's display, the user enters his email address and his password (step 95). Next, the user clicks "log-in", thereby sending the filled log-in page to the web server (step 96). Completing these procedures confirms that screen presentations and operation of the button presses, as well as messages from the user, are properly functioning.

After receiving the filled log-in page from the browser (step 88), the web server determines whether the page is properly filled, and whether the username and password match a list of usernames and passwords stored in processor 42 (step 89). After successful completion of the validation sequence, step 89 branches to step 91 and sends the restricted access page to the user. An authorization cookie may also be sent to the user interface unit (not shown). This allows the user to continue accessing restricted access pages without re-entering his password. Typically, the verified user may be permitted access for a predetermined time interval (for example, 10 minutes). The user may request and receive restricted access pages (steps 97 and 92) as long as the authentication cookie is valid. The cookie may automatically expire after expiration of the predetermined interval, thereby denying user access. As shown, step 98 determines whether the predetermined time interval has expired. So long as the interval has not expired, access to restricted pages is permitted. Once the time interval expires, the process branches to step 99 and ends the session.

Completing the description of process 80, if step 89 determines that the log-in procedure is not valid, the process branches to decision block 90. Decision block 90 determines whether the user has attempted log-in more than a specific number of times (for example, 3 times). If the user has attempted unsuccessfully to log on more than the specific number of times, the process branches to step 87 and sends an incompatibility message to the user's browser. Optionally, the unauthorized access attempt is printed or otherwise recorded.

It will be appreciated that in another embodiment, instead of the web server sending an authentication cookie to the user's browser and the user's browser returning the authentication cookie to the web server, the web server may create and store an authentication token in the database, without requiring the user's browser to store and send an authorization cookie to the web server.

Figure 7:
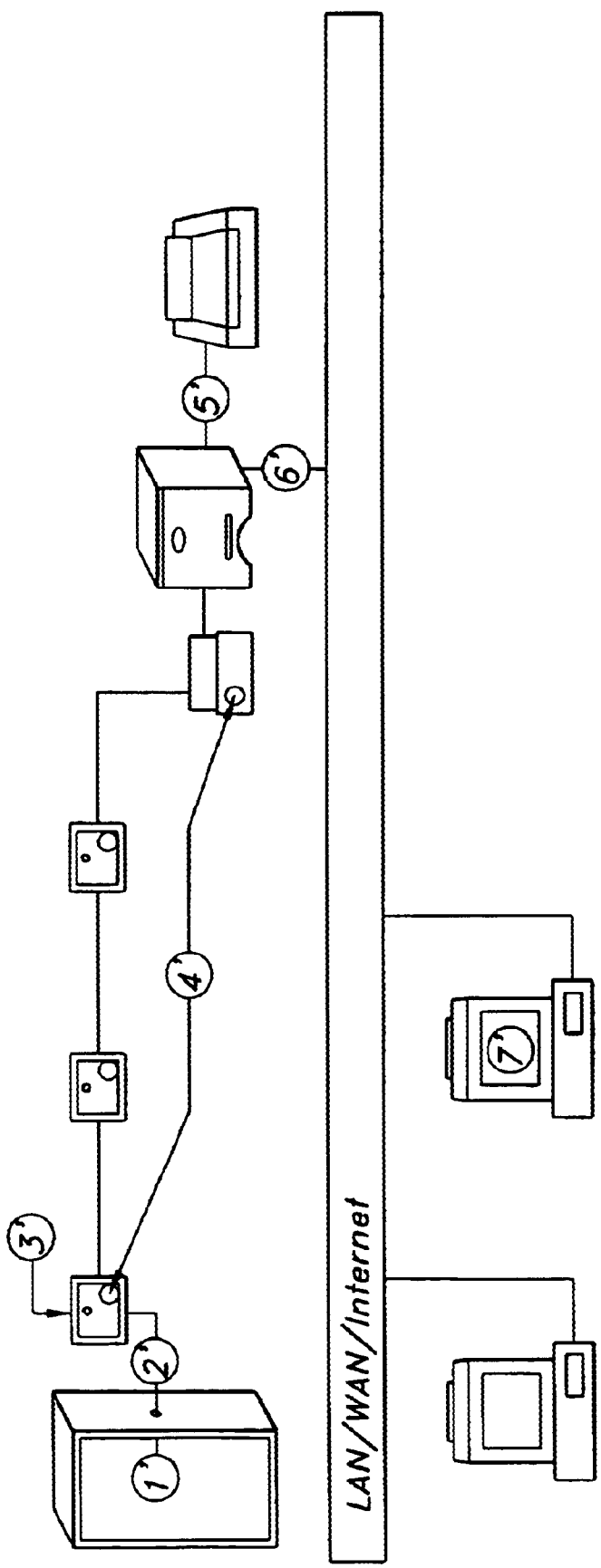
FIG. 7 is an illustration of an embodiment of a computer-implemented system for monitoring the temperature of human blood in accordance with another embodiment of the present invention.

FIG. 7 illustrates an exemplary embodiment of a computer-implemented system used to monitor the temperature of blood stored in banks of refrigerators. Referring to FIG. 7, the system includes at least one sensor 1' in the environment (i.e., a temperature or humidity sensor extending into a refrigerator, for example). The sensor can detect when the condition within the environment is out of a pre-determined range. The sensor transmits information to a data collector 3' by means of a connection 2'. An audible alert can be actuated at both the data collector 3' and a central station server as indicated at 4'. A printer 5' is provided to automatically print the nature of the alarm. The central station server can make the alarm information available to user terminals via LAN, WAN, for an Internet network via connection 6'. The user, from a user interface unit 7', responds to the alarm from any computer connected to the network.

The embodiment illustrated in FIG. 7 provides a high-reliability, fail-safe central monitoring system with local or global network access. Users can access the system to view system information, generate reports and respond to alarm conditions. Multiple users can access the system simultaneously from anywhere that there is access to a local, corporate, or dial-up network.

As described previously, the data processing function of the system are separated from the user interface as opposed to being incorporated into the same software application. By separating these functions, the system validation is not affected by changes to the user's terminal. Preferably, successful system access automatically validates or verifies the user's terminal.

The data collector 3' illustrated in FIG. 7 gathers and transmits data to the central station. The data collector 3' is preferably mounted near the equipment that it is dedicated to monitor. Also, the data collector 3' preferably incorporates an audible and visual indication of conditions. According to one preferred embodiment, each data collector 3' monitors (2) analog and digital inputs as well as battery and AC power. Battery back up, with built-in charger and automatic load testing, can be provided to assure normal operation in the event of power loss. The data collector 3' allows the system to operate as a redundant, fail-safe monitoring system. Because the data collector 3' can be configured to act independently from all other system components, even a failure in the system hardware or software cannot cause a complete system shut down. Accordingly, the user of the system is provided with uninterrupted monitoring and is assured immediate notification of all events.

The central station can provide data processing for a large number of data collectors. For example, if 250 data collectors are used in the system, the system can accommodate 500 analog sensors and 500 digital inputs. In the event of any unsafe deviation from the pre-determined set points of the controlled environments, the central station redundantly documents the occurrence on a continuous print out and in the central database. An audible alarm at the central station, as well as the audible alarm at the data collector, alerts the user to the unsafe deviation.

Table 1 lists technical specifications of an exemplary blood bank center such as the one illustrated in FIG. 7. Table 2 shows an exemplary printout of the blood bank center.

TABLE 1

Technical Specifications of an Exemplary Blood Bank Center

| Data Collector | |
|---|---|
| Input Channels | |
| Analog | 2 |
| Digital | 2, Contact |
| Measurement Ranges | |
| Temperature | −200° C. to +85° C. |
| Humidity | 5% RH to 95% RH |
| Others | Please consult factory |
| Output | SPDT, 5A Resistive, 120 VAC |
| Alarms | High & Low Limit, per channel |
| Indicators | |
| Visual, LED | High Limit |
| | Low Limit |
| | Network Activity |
| | Power Status |
| | Battery Status |
| | Safe |
| Audible | Adjustable volume beeper |
| Supply Voltage | North America: 120 VAC, 60 Hz |
| | Others available |
| Backup Battery | |
| Type: | NiCd, permanent |
| Operating Life: | 24 hours minimum |
| Data Collector Network | |
| Type | Digital Current Loop |
| Segments | 4 |
| Max. Segment Length | 4,000 feet |
| Max. Collectors/segment | 65 |
| Isolation | 1500 Vrms, minimum |
| Central Station Server | |
| Processor | MIPS or Intel x86 |
| RAM | 32 Mbytes minimum |
| Disk Storage | 6.4 Gbytes, typical |
| Input/Output | 10 Mbit Ethernet, 1 port minimum |
| | RS-232 Serial, 2 Ports minimum |
| | Parallel, 1 port minimum |
| Supply Voltage | North America: 120 VAC, 60 Hz |
| | Others Available |
| Network Protocol | TCP/IP |
| Content Protocols | HTTP 1.0, minimum |
| | FTP |
| | SMTP |
| | SSL, optional |

TABLE 2

Example of Format of Printout (event.log) Status Report

| | | | | | |
|---|---|---|---|---|---|
| 07 Nov. 1991 | 12:00 | Refrigerator | #4 top | (001-1) | temp = 4.1 |
| 07 Nov. 1991 | 12:00 | Refrigerator | #4 bot | (001-2) | temp = 3.8 |
| 07 Nov. 1991 | 12:01 | ***** Alarm: | Power Failure | | ***** |
| 07 Nov. 1991 | 12:01 | Refrigerator | #4 top | (001-1) | temp = 6.1 |
| 07 Nov. 1991 | 12:01 | Refrigerator | #4 bot | (001-2) | temp = 6.1 |
| 07 Nov. 1991 | 12:01 | ***** Alarm: | Door Open | | ***** |
| 07 Nov. 1991 | 12:01 | Refrigerator | #4 top | (001-1) | temp = 5.2 |
| 07 Nov. 1991 | 12:02 | ----- Safe: | Door Closed | | ----- |
| 07 Nov. 1991 | 12:02 | Refrigerator | #4 top | (001-1) | temp = 6.3 |
| 07 Nov. 1991 | 12:03 | ***** Alarm: | High temperature | | ***** |
| 07 Nov. 1991 | 12:03 | Refrigerator | #4 top | (001-1) | temp = 6.1 |

It will be appreciated that the user interface unit is not intended to remain validated; its validation is simple enough to be performed at each use. As an example, the user interface unit may present text, images or a procedure as a "test page". If the page displays and prints correctly, the user interface portion is validated. The validation of the processor is unaffected by this procedure and the result is that the user interface unit may be revalidated at any time. This allows the user interface unit to change or even be entirely replaced without voiding the validation of the processor.

In order to illustrate the benefits of the system and method according to this invention, the example of a common spreadsheet system can be considered. In order to produce a validated system (e.g., for compliance with FDA regulations), the following steps should occur:

1. Documentation of the instance of the computer to be used:
   A. Hardware platform, memory and peripheral configuration,
   B. Software configuration, including operation system and revision level, version and revision of hardware drivers, and
   C. Application version and revision level.
2. Generation of a test plan to demonstrate how the system will work including, for instance, test cases and expected results; and
3. Documentation that the system did perform as expected.

Any changes to any element of the foregoing system, such as changing a piece of hardware or a software driver, should be followed by some form of revalidation.

The system and method according to this invention, however, is adapted to minimize the additional work required of the user when changes to the system are made. For example, the validation of the spreadsheet system outlined above can be limited to the following steps using the system and method according to this invention:

1. Documentation of the instance of the computer to be used:
   A. Any software platform which will support a browser (or other network or application program interface) which can properly execute a login protocol, and
   B. Any hardware platform which will support the software platform;
2. Test Plan: Execute the user login; and
3. Document completion: User is allowed access.

Accordingly, the system and method according to this invention can be configured to instantly re-validate the instance of a user workstation without effecting the validation of a central server. Accordingly, the system can include multiple computers, at least some of which can be instantly re-validated in the course of their normal usage. In other words, this invention can provide a system that is validated wherein a central portion of the system (e.g., a central application program configured to receive data) is continuously maintained in a validated state and a separate portion of the system (e.g., a separate application program configured to access the data in the central application program) is periodically validated (e.g., prior to communication or interaction with the central portion of the system), thereby providing a validated system including both the central and separate portions to facilitate reliable communication. The separate portion of the system is preferably periodically validated prior to or at each occurrence of communication with the central portion.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

It will be understood, for example, that the present invention allows for one or more user interface units accessing one or more processors.

Alternative implementations also allow for further division of the functions across more units, i.e., a data input unit, a processing unit, a data output unit and user interface unit or any other combination where the user interface is a distinct unit which may be quickly validated.

While this invention has been described in the biomedical (FDA regulated, etc.) field, the invention is equally applicable to any situation where it is desired to use a computer of unknown background as part of a "provable" system. Minimizing the validation requirements of the user interface unit allows varying portions of the system to be proven whenever necessary without placing a significant burden on the user or interfering with the overall system functionality.

It will be appreciated that further variations and modifications of the embodiments selected for illustration in the figures can be made without departing from the spirit or the scope of this invention. The scope of this invention is defined separately in the appended claims.

What is claimed:

1. A system for monitoring a condition of a controlled environment, said system comprising:
   a first computer configured to store data corresponding to the condition of the controlled environment, said first computer being validated, wherein subsequent alteration of said first computer voids validation of said first computer;
   a second computer coupled to said first computer, said second computer having an application program configured to facilitate access to the data stored in said first computer and for communication of the condition of the controlled environment to a user of said second computer, wherein alteration of said second computer does not void validation of said first computer; and
   a validation module configured to validate the application program of said second computer for said access and said communication to confirm that the application program of the second computer is configured to communicate the condition of the controlled environment to the user, thereby validating said system comprising said first computer, said second computer, and said validation module.

2. The system defined in claim 1, said first computer comprising a central application program for storing data and said second computer comprising a separate application program for accessing the data.

3. The system defined in claim 1, further comprising a data collector coupled to said first computer to transmit data to said first computer.

4. The system defined in claim 1, further comprising a sensor positionable to detect the condition of the controlled environment, said sensor being coupled to said first computer to provide data corresponding to the condition of the controlled environment.

5. The system defined in claim 1, further comprising a plurality of data collectors coupled to said first computer to transmit data to said first computer and a plurality of sensors coupled to said first computer via said data collectors to provide data to said data collectors.

6. The system defined in claim 1, further comprising a communications network coupling said second computer to said first computer.

7. The system defined in claim 6, said communications network being selected from the group consisting of a LAN, a WAN, and the Internet.

8. The system defined in claim 1, said validation module being configured to transmit indicia to a user of said second computer and to verify the user's receipt of the transmitted indicia.

9. The system defined in claim 8, said indicia being selected from the group consisting of sounds, symbols, colors, text, and combinations thereof.

10. The system defined in claim 1, said first computer comprising an application program configured to retrieve data corresponding to the condition of the environment.

11. The system defined in claim 1, said first computer comprising a database application program configured to store data corresponding to the condition of the environment.

12. The system defined in claim 1, said first computer comprising a server configured to facilitate communication between said first computer and said second computer.

13. The system defined in claim 1, said second computer comprising a browser configured to facilitate communication between said second computer and said first computer.

14. The system of claim 1 further comprising an authentication module, residing in said first computer, for providing access permission to said second computer, wherein said validation module validates said application program of said second computer before or after providing access permission to said second computer.

15. In a system having a central application program that can be linked for communication with a separate application program, a method for monitoring a controlled environment comprising the steps of:
 (a) validating the central application program;
 (b) collecting and storing data from the controlled environment using the central application program;
 (c) validating the separate application program for communication of data from the central application program;
 (d) linking the separate application program for access to the central application program; and
 (e) communicating data from the central application program to the separate application program without voiding validation of the central application program.

16. The method defined in claim 15, said validating step (c) comprising:
 (a) transmitting indicia to a user of the separate application program in response to a request for data from the central application program;
 (b) surveying the user of the separate application program regarding the user's receipt of the transmitted indicia;
 (c) verifying the accuracy of the survey results; and
 (d) providing access by the separate application program to data collected and stored by the central application program.

17. The method defined in claim 16, wherein said transmitting, surveying, and verifying steps are completed prior to said providing step.

18. The method defined in claim 15, said validating step (c) being performed prior to said linking step (d) at each instance of a request for access to the central application program via the separate application program.

19. In a system having a central application program for collecting and storing data and a separate application program for accessing the data, a method for validating the separate application program for communication of data from the central application program before permitting access to the central application program by the separate application program, the method comprising the steps of:
 (a) transmitting indicia to a user of the separate application program in response to a request for data from the central application program;
 (b) surveying the user of the separate application program regarding the user's receipt of the transmitted indicia;
 (c) verifying the accuracy of the survey results; and
 (d) providing access by the separate application program to data collected and stored by the central application program.

20. The method defined in claim 19, said transmitting step comprising transmitting indicia selected from the group consisting of sounds, symbols, colors, text, and combinations thereof.

21. The method defined in claim 19, wherein said transmitting, surveying, and verifying steps are completed prior to said providing step.

22. A system for monitoring a condition of a controlled environment, said system comprising:
 a first computer configured to store data corresponding to the condition of the controlled environment, said first computer being validated, wherein subsequent alteration of said first computer voids validation of said first computer;
 a second computer coupled to said first computer, said second computer having an application program configured to facilitate access to the data stored in said first computer and for communication of the condition of the controlled environment to a user of said second computer, wherein alteration of said second computer does not void validation of said first computer; and
 a validation module configured to validate the application program of said second computer for said access and said communication, thereby validating said system, said validation module being configured to transmit indicia to a user of said second computer and to verify the user's receipt of the transmitted indicia.

* * * * *